(12) United States Patent
Collopy

(10) Patent No.: US 7,311,523 B2
(45) Date of Patent: Dec. 25, 2007

(54) METHOD OF TIMING HAND WASHING

(75) Inventor: Charles T. Collopy, 2118 Country Club Cove, Ft. Collins, CO (US) 80524

(73) Assignee: Charles T. Collopy, Fort Collins, CO (US)

( * ) Notice: Subject to any disclaimer, the term of this patent is extended or adjusted under 35 U.S.C. 154(b) by 360 days.

(21) Appl. No.: 11/018,257

(22) Filed: Dec. 21, 2004

(65) Prior Publication Data

US 2005/0108908 A1    May 26, 2005

Related U.S. Application Data

(63) Continuation of application No. 09/957,345, filed on Sep. 20, 2001, now Pat. No. 6,832,916.

(60) Provisional application No. 60/252,401, filed on Nov. 20, 2000.

(51) Int. Cl.
*G09B 19/00* (2006.01)

(52) U.S. Cl. ....................................... 434/236

(58) Field of Classification Search ................ 340/573, 340/573.1; 434/236; 222/321.9, 644, 192, 222/321.7, 321.1; 273/445, 446
See application file for complete search history.

(56) References Cited

U.S. PATENT DOCUMENTS

| 356,695 A | 1/1887 | Reid et al. |
|---|---|---|
| 1,923,978 A | 8/1933 | Hill |
| 2,926,487 A | 3/1960 | Stone |
| 4,606,085 A | 8/1986 | Davies ........................... 4/619 |
| 4,609,127 A | 9/1986 | Hart ............................. 222/66 |
| 4,878,845 A | 11/1989 | Lindsay et al. |
| 4,934,940 A | 6/1990 | Savery |
| 5,202,666 A * | 4/1993 | Knippscheer ............ 340/573.1 |
| 5,570,325 A | 10/1996 | Arpadi |
| 5,577,915 A | 11/1996 | Feldman |
| 5,715,973 A | 2/1998 | Foster et al. ........... 222/153.13 |
| 5,759,042 A | 6/1998 | Laka ........................... 434/236 |
| 5,781,942 A | 7/1998 | Allen et al. |
| 5,788,505 A | 8/1998 | Sharkey ...................... 206/570 |
| 5,794,821 A | 8/1998 | Foster et al. .............. 222/321.9 |
| 5,870,015 A * | 2/1999 | Hinkel .................... 340/573.1 |
| 5,945,910 A | 8/1999 | Gorra |
| 5,979,500 A | 11/1999 | Jahrling et al. ......... 137/624.12 |
| 5,988,440 A | 11/1999 | Saunders et al. ............. 222/63 |
| 6,037,871 A | 3/2000 | Babylon |

(Continued)

OTHER PUBLICATIONS

Minnesota Department of Health, "Comprehensive List of Handwashing Print Materials: Handwashing Tool Kit" 7 pages from www.health.state.mn.us/handhygiene/toolkit/about/materials.html.*

*Primary Examiner*—Kien T. Nguyen
(74) *Attorney, Agent, or Firm*—Craig Miles; CR Miles, P.C.

(57) ABSTRACT

A hand washing device and method encouraging hand washing includes a display panel, a message "WASH UP with Soap and Water. Get rid of germs in only 15 seconds." and may have one of a variety of timing means to time the wash cycle or the user may use an ordinary clock. Germ illustrations indicate consequences. The panel is on personal and public use soap dispensers and return springs are used as the timing device.

12 Claims, 4 Drawing Sheets

U.S. PATENT DOCUMENTS

| | | | |
|---|---|---|---|
| 6,053,371 A | 4/2000 | Durliat et al. | 222/321.9 |
| 6,056,163 A | 5/2000 | Lai | 222/321.2 |
| 6,065,639 A | 5/2000 | Maddox et al. | 222/36 |
| 6,125,482 A | 10/2000 | Foster | 4/623 |
| 6,230,942 B1 | 5/2001 | Kuo | 222/321.9 |
| 6,236,953 B1 | 5/2001 | Segal | 702/127 |
| 6,375,038 B1 | 4/2002 | Daansen et al. | 222/39 |
| 6,404,837 B1 | 6/2002 | Thompson et al. | 377/13 |
| 6,417,773 B1 * | 7/2002 | Vlahos et al. | 340/573.1 |
| 6,542,568 B1 * | 4/2003 | Howes et al. | 377/16 |

* cited by examiner

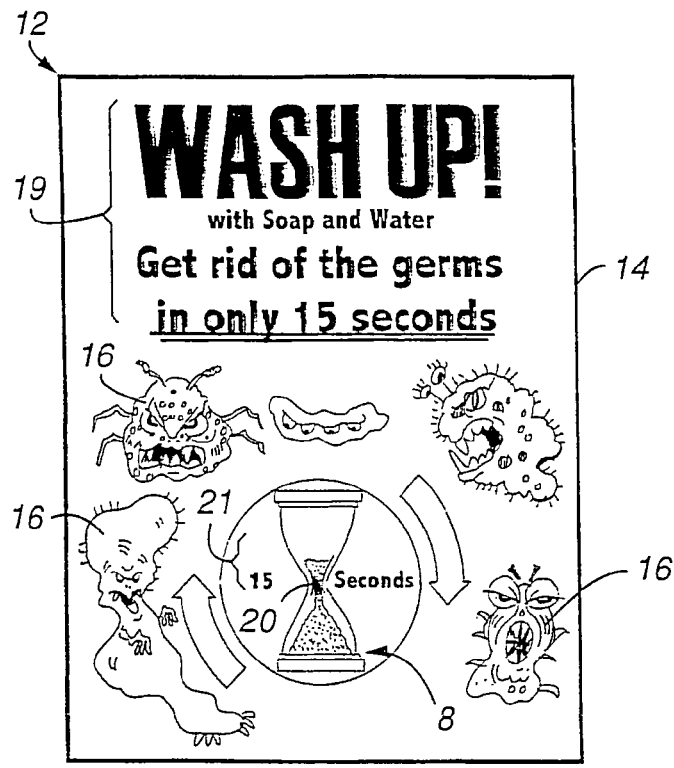
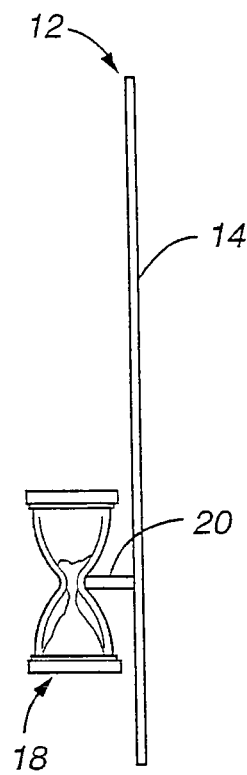
Fig. 1　　　　　　　　Fig. 2
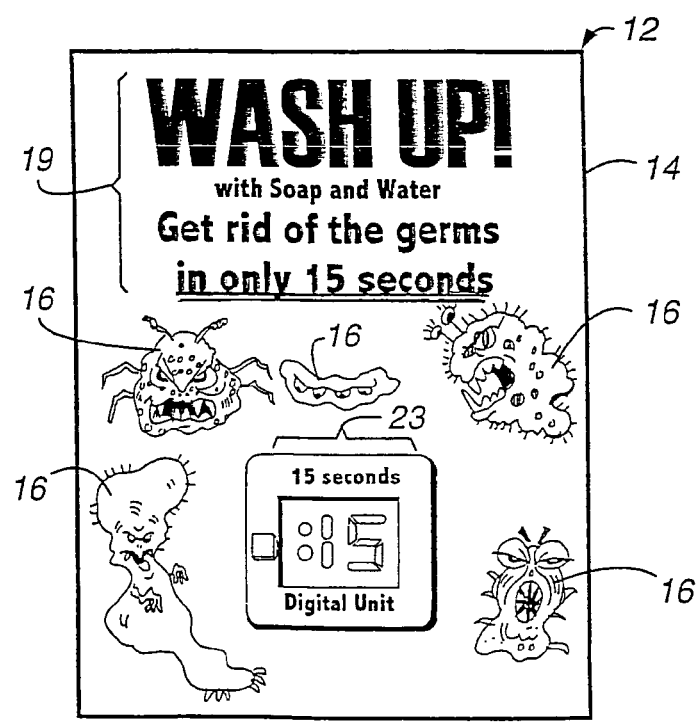
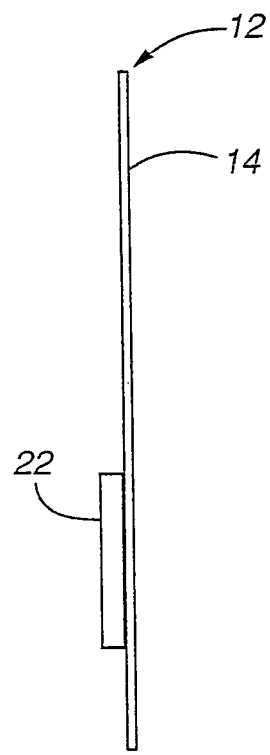
Fig. 3　　　　　　　　Fig. 4

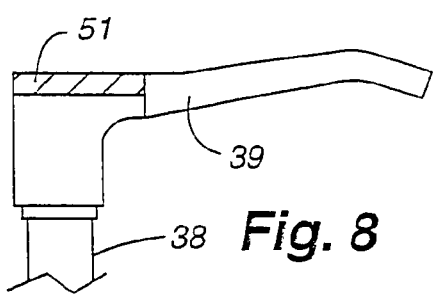
Fig. 8
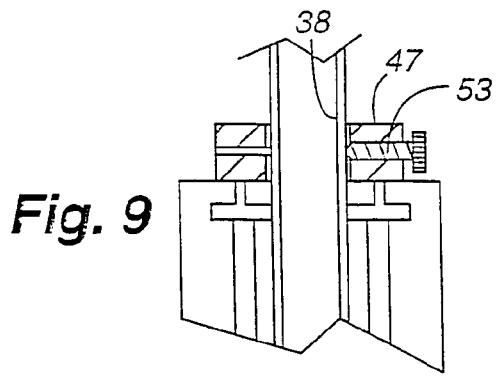
Fig. 9
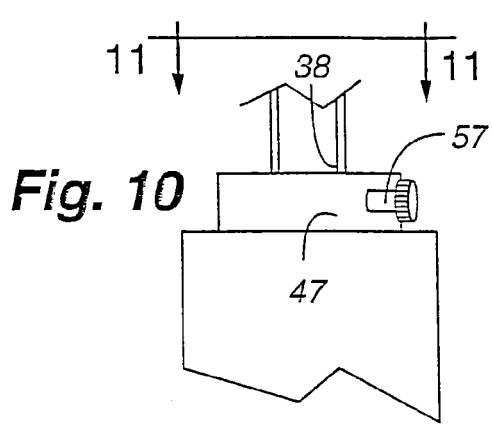
Fig. 10
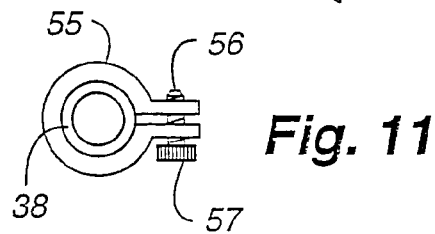
Fig. 11
Fig. 12
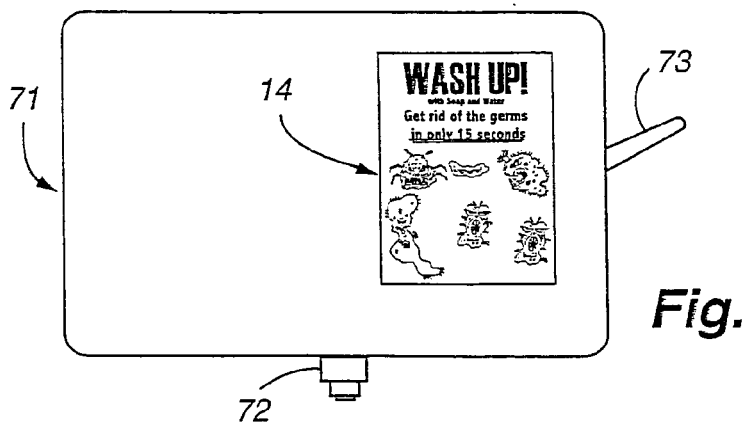
Fig. 13
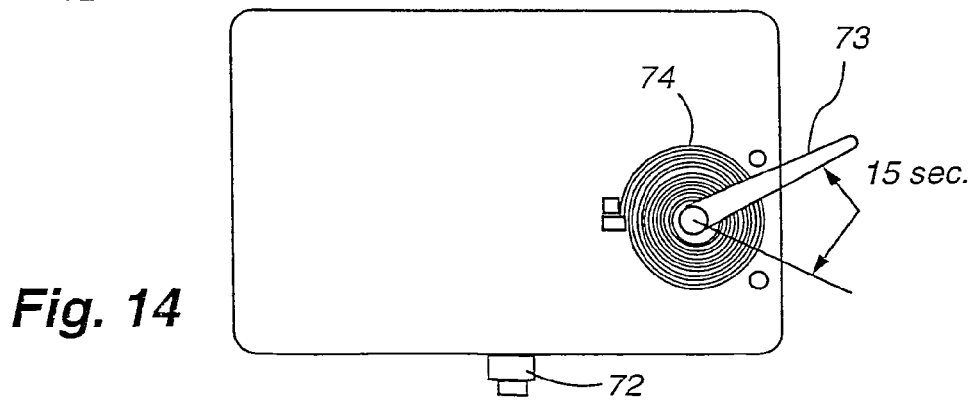
Fig. 14

METHOD OF TIMING HAND WASHING

This continuation application claims priority to U.S. patent application Ser. No. 09/957,345, now issued as U.S. Pat. No. 6,832,916, filed Sep. 20, 2001, which claims the benefit of U.S. Provisional Patent Application No. 60/252,401, filed Nov. 20, 2000, each incorporated by reference herein.

TECHNICAL FIELD

This invention relates to devices and methods for encouraging persons to wash their hands with soap and for longer than the usual hand washing time intervals.

BACKGROUND ART

There is a high incidence of communicable diseases in the U.S. as well as throughout the entire world. The American Society of Microbiologists has indicated that adequate hand washing will greatly reduce the incidence of communicable diseases. There is special concern for such contacts as person to person, person to pets, persons to children, persons to home food, persons to public food, persons to money, persons coughing and sneezing, persons use of home bathrooms and persons use of public restrooms. Recent surveys have revealed that nearly 95 percent of the people claim to have washed their hands after use of public restrooms but actual observations reveal that this figure does not exceed 66 percent.

There is also a tendency to hurry up the hand washing process and do a cursory job for only several seconds and this is believed inadequate. Failure to wash hands adequately may result in the spreading of colds, diarrhea, and other infectious diseases such as meningitis, flu and other viruses.

Several prior patents relate to hand washing.

Gorra U.S. Pat. No. 5,945,910 discloses method and apparatus for monitoring and reporting hand washing. Allen et al. U.S. Pat. No. 5,781,942 discloses wash stations and method of operation which monitors hand washing and assists in hand washing. Stone U.S. Pat. No. 2,926,487 discloses a tooth brush holder and a timer for encouraging tooth brushing.

DISCLOSURE OF THE INVENTION

A hand washing display device and method preferably located adjacent a hand washing facility for encouraging hand washing which includes a display panel, a first message indicia on the display panel encouraging hand washing longer than a minimum time interval, preferably fifteen seconds, a second message indicia on the display panel depicting germs for indicating consequences for not washing according to the first message and timing means in the form of an hour glass or a digital clock indicating that time has exceeded the predetermined minimum time interval of the first message indicia. Soap dispensers are one way of supporting the panel and the springs are used as the timing devices.

BRIEF DESCRIPTION OF THE DRAWINGS

Details of this invention are described in connection with the accompanying drawings which like parts bear similar reference numerals in which:

FIG. 1 is a front elevation view of a display device embodying features of the present invention.

FIG. 2 is a side elevation view of the device shown in FIG. 1.

FIG. 3 is a front elevation view of a modified display device embodying features of the present invention.

FIG. 4 is a side elevation view of the device shown in FIG. 3.

FIG. 8 is a fragmentary sectional view of a modification of the display device shown in FIGS. 6 and 7 using a weighted plunger.

FIG. 9 is a sectional view of a modification of the display device shown in FIGS. 6 and 7 showing a set screw.

FIG. 10 is a fragmentary sectional view of a modification of the display device shown in FIGS. 6 and 7 showing a squeeze clamp.

FIG. 11 is a sectional view taken along line 11-11 of FIG. 10.

FIG. 12 is a fragmentary sectional view of a modified form of the device shown in FIGS. 6 and 7.

FIG. 13 is a front elevation view of a display device embodying features of the present invention on another form of soap dispenser.

FIG. 14 is a sectional view of the device shown in FIG. 13 showing the internal coil spring for controlling the return time for the dispensing lever.

DETAILED DESCRIPTION

Figure 5:
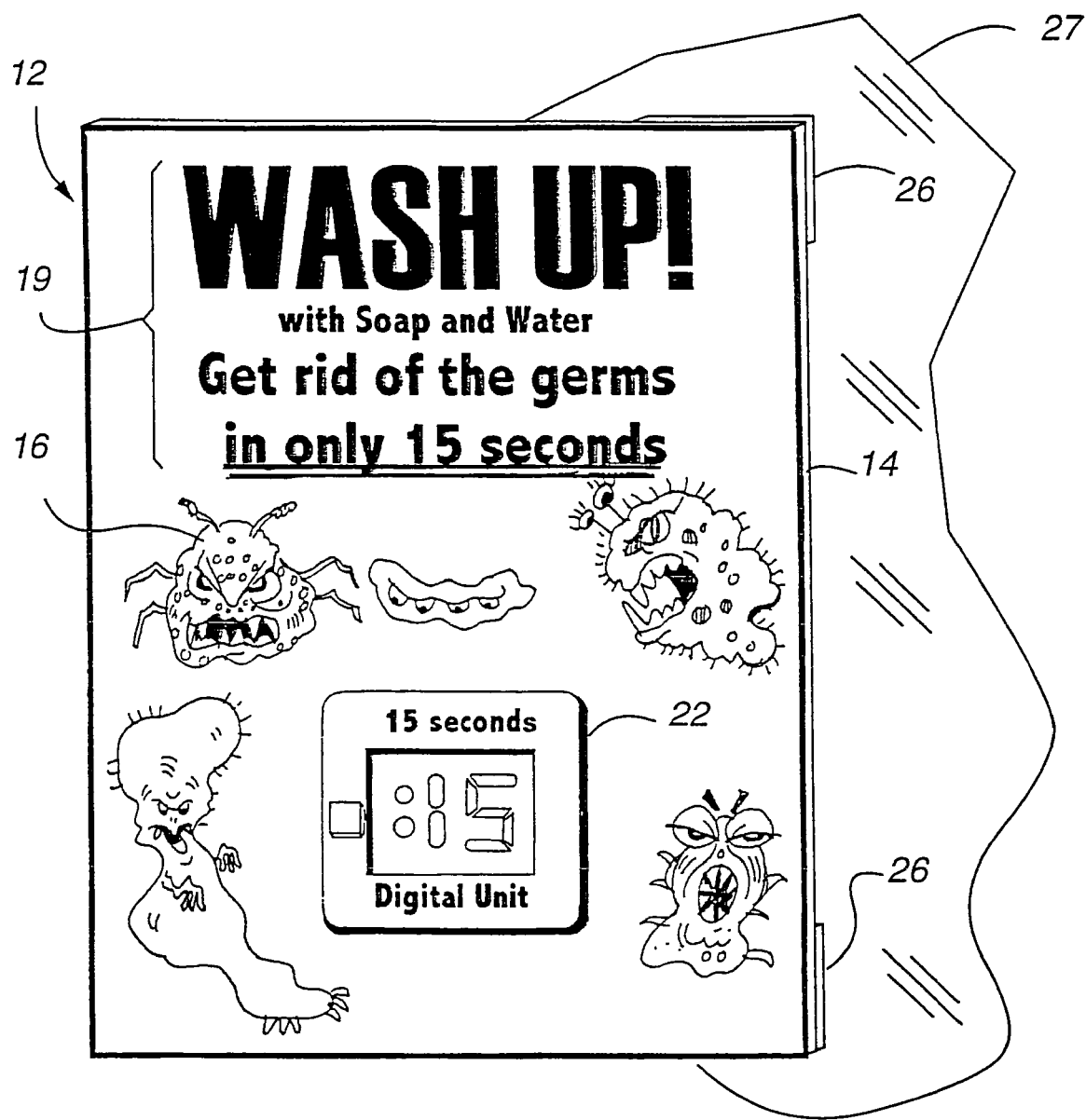
FIG. 5 is a front fragmentary perspective view of the device shown in FIG. 3 with an adhesive added to the back and mounted to a flat support surface.

In accordance with the present invention, there is provided a display device 12 adapted to be located preferably at a hand washing facility which device 12 encourages hand washing. The device 12 shown includes a display panel 14 in the form of a poster board or backing sheet having a first message indicia encouraging persons to wash their hands with soap and water for at least fifteen seconds. The panel is of a rigid material to be free standing if required. The time period of 15 seconds is considerably longer than the usual hand washing time and is selected to take into account the human tendency to do less than instructed. While a time period of 10 seconds may be adequate dealing with most bacteria a 15 second message is preferred. Warm water is preferred. The message indicia 19 shown is: "WASH UP! with Soap and Water. Get rid of germs in only 15 seconds."

The second message indicia 16 on the display panel depicts several germs in an illustrative form for indicating the consequences for not washing according to the first message indicia. A timer 18 shown as an hourglass indicates that the washing time has reached or exceeded the predetermined time interval indicated by the time indicia 21, "15 seconds". The hourglass 18 mounted on a central pivot 20 supported by the panel 14 that would be turned over to retime and indicates fifteen seconds has elapsed when the lower portion has filled with sand. While a timer or timing means is shown it is understood that the device may be effective with the user using an ordinary clock such as a wrist watch, household clock, etc.

Referring now to FIGS. 3 and 4 the second embodiment shows the same arrangement of display panel 14, indicia 15 and indicia 16 but has a digital clock 22 displaying numbers instead of an hourglass to indicate a minimum time interval indicated by the timer indicia 23 of "15 seconds". Clock 22 has a reset button 24.

Referring now to FIG. 5 there is shown the display device 12 having the display panel 14 provided with an adhesive or adhesive layer 26 on the back surface that mounts and secures the panel 14 to a flat support surface 27, typically a mirror above a private or public hand washing facility.

Figures 6, 7:
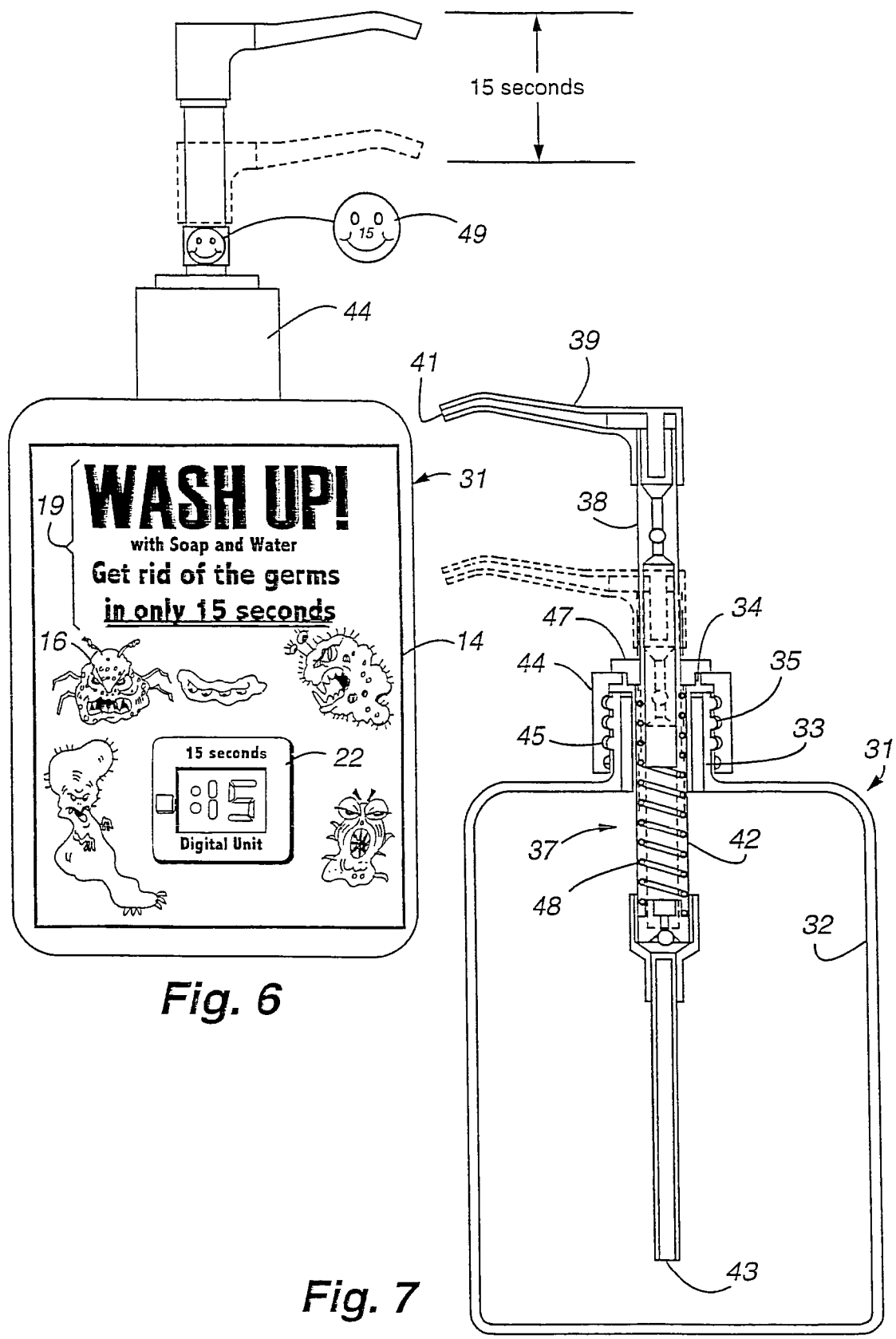
FIG. 6 is a front elevation view of a display device shown in FIGS. 3 and 4 on a personal soap dispenser with the down position for the soap dispensing plunger shown in dashed lines.
FIG. 7 is a vertical sectional view of the device shown in FIG. 6.

Referring now to FIGS. 6 and 7 there is shown a display panel 14 on the front wall of a personal use soap dispenser 31. The personal use soap dispenser 31 includes a container 32 having a neck 33 with a top opening 34 through which liquid hand soap can be poured to fill the container. The neck 33 has external threads 35. A pump assembly 37 removable from the container 32 includes a hollow plunger 38 in the form of a tube with a hollow depressible top handle 39 extending out at right angles to the plunger tube 38. The outer end of the handle 39 terminates in a discharge opening 41. The plunger 38 fits in an outer tube 42 that extends down into the container and has an intake opening 43 in the bottom thereof through which soap will pass when pumped. A cap 44 with internal threads 45 telescopes over the tube at the top and is retained by a top collar 47. The cap 44 has threads on the neck 33. A coil spring 48 inside the outer tube 42 is compressed by the plunger 38 when the plunger is moved down and is returned to the up position by the action of the spring 46. A reward symbol 49 in the form of a happy face is provided on the plunger that appears when the plunger has returned to the up position after 15 seconds. The indicia 15 is marked on the happy face to indicate the selected time interval.

The tension on the spring 48 is selected to return the plunger in 15 seconds. The tension in the spring may be weakened so the plunger will take a selected time to return. This then serves as a timing device for the hand washing cycle. An alternative to the weakened spring would be to provide a weight 51 in the plunger handle as shown in FIG. 8 so that the plunger will return to the up position in the selected time interval of 15 seconds.

The time interval can be controlled by various types of drag means on the plunger 38 which would include a set screw 53 that threads into the collar 47 and is adjusted to engage the plunger 38 as is shown in FIG. 9. As shown in FIGS. 10 and 11 the drag may be provided by using a squeeze clamp 55 mounted to the top of collar 47 which is contracted and expanded by means of a bolt 56 and nut 58 that grasp the plunger 38 to provide a selected drag.

Finally, in the embodiment shown in FIG. 12 that is provided a series of axially spaced circumferentially extending protrusions 59 on the periphery of the plunger 38 that bear against a protrusion 61 on flange 47 to provide a drag on the plunger.

Referring now to FIGS. 13 and 14 there is shown a display panel on the front of another type of soap dispenser 71 frequently found in public places and herein referred to as a public use soap dispenser. Dispenser 71 has a dispenser outlet 72 together with a dispensing lever 73 which upon downward movement against the action of a coil spring 74 will cause the soap to be dispensed. The tension on the spring 74 is selected to return the lever in the selected time interval of 15 seconds.

It is generally agreed by numerous sources that washing with soap and water or an antibacterial liquid is a very effective measure for prevention of many diseases. The display devices of the present invention is attractive as well as encourages hand washing. The device makes a definite suggestion as to the time required for a truly effective hand wash. The device is simple and amusing and provides a means to time the hand washing procedure. It is believed that the display device would greatly increase the frequency of adequate hand washing in the home, public restrooms, restaurants, grocery stores and other work places. The display device is 1) a polite reminder to wash the hands with soap and water, 2) a highly illustrative drawing of germs which should be most unwelcome to anyone's hands, 3) a simple but amusing device to time the hand washing procedure with the time being considerably longer than the usual wash cycle plus it is believed to be psychologically effective in stressing that only fifteen seconds is needed, and 4) it is believed to allow for a simple procedure to encourage adequate hand washing and if followed will make great strides against the spread of germs. The term "germs" as used herein refers to all pathogenic microorganisms such as bacteria, viruses, Rickettsia, and the like.

Although the present invention has been described with a certain degree of particularity, it is understood that the present disclosure has been made by way of example and that changes in details of structure may be made without departing from the spirit thereof.

What is claimed is:

1. A method to time handwashing, comprising the steps of:
   a) providing a container;
   b) establishing a hand wash soap in said container;
   c) generating travel in a reciprocal means of a soap dispenser element from a first position to a second position;
   d) dispensing said hand wash soap from said container;
   e) activating a return element coupled to said reciprocal means to return said reciprocal means from said second position to said first position in a time interval; and
   f) providing a time interval control element coupled to said reciprocal means which allows adjustment of said time interval to a selected hand wash time interval.

2. The method to time handwashing as described in claim 1, wherein said step generating travel in a reciprocal means of a soap dispenser element from a first position to a second position comprises generating travel in a plunger from a first position to a second position.

3. The method to time handwashing as described in claim 2, wherein said step of providing a time interval control element coupled to said reciprocal means which allows adjustment of said time interval to a selected hand wash time interval comprises the step of providing a drag means coupled to said reciprocal means which allows adjustment of said time interval to a selected hand wash time interval.

4. The method to time handwashing as described in claim 3, wherein said step of providing a drag means coupled to said reciprocal means which allows adjustment of said time interval to a selected hand wash time interval comprises the step of adjusting engagement of a set screw with said plunger.

5. The method to time handwashing as described in claim 3, wherein said step of providing a drag means coupled to said reciprocal means which allows adjustment of said time interval to a selected hand wash time interval comprises the step of adjusting engagement of a squeeze clamp with said plunger.

6. The method to time handwashing as described in claim 3, wherein said step of providing a drag means coupled to said reciprocal means which allows adjustment of said time interval to a selected hand wash time interval comprises the step of coupling a series of axially spaced circumferential protrusions coupled to said plunger which slidely engage a surface of said container.

7. The method to time handwashing as described in claim 2, wherein said step of providing a time interval control element coupled to said reciprocal means which allows adjustment of said time interval to a selected hand wash time interval comprises the step of providing an amount of weight coupled to said reciprocal means which allows adjustment of said time interval to a selected hand wash time interval.

8. The method to time handwashing as described in claim 2, wherein said step of activating a return element coupled to said reciprocal means to return said reciprocal means from said second position to said first position in a time interval comprises the step of generating an amount of tension in a spring adjusted to return said reciprocal means from said second position to said first position in said selected hand wash time interval.

9. The method to time handwashing as described in claim 2, further comprising the step of coupling an indicia to said plunger which becomes visible when said plunger returns to said first position.

10. The method to time handwashing as described in claim 2, further comprising the step of selecting said indicia coupled to said plunger from the group consisting of a happy face, a mark, and a symbol.

11. The method to time handwashing as described in claim 1, wherein said step of generating travel in a reciprocal means of a soap dispenser element from a first position to a second position comprises the step of generating travel in a dispenser lever from a first position to a second position.

12. The method to time handwashing as described in any one of claims 1, 3, 4, 5, 6, 7, 9, or 11, further comprising the step of adjusting said selected hand wash time interval to provide a duration of time between about 10 seconds and about 20 seconds.

* * * * *